United States Patent [19]

Watanabe et al.

[11] Patent Number: 5,538,542

[45] Date of Patent: Jul. 23, 1996

[54] FUEL VAPOR CAPTURING CANISTER HAVING INCREASED DISTANCE OF FLOW OF FUEL VAPOR PASSING THROUGH ADSORBENT LAYER

[75] Inventors: Hideo Watanabe; Hiroaki Mihara, both of Wako; Kouichi Ikuma, Hamakita; Takenori Suzuki, Hamamatsu, all of Japan

[73] Assignees: Toyo Roki Seizo Kabushikikaisha, Shizuoka-ken; Honda Giken Kogyo Kabushiki Kaisha, Tokyo, both of Japan

[21] Appl. No.: 341,184

[22] Filed: Nov. 18, 1994

[30] Foreign Application Priority Data

Nov. 19, 1993 [JP] Japan ................................. 5-314566

[51] Int. Cl.⁶ .................................................. B01D 53/04
[52] U.S. Cl. ................................. 96/131; 95/146; 96/139; 96/147; 96/152; 123/519
[58] Field of Search ..................... 95/143, 146; 55/385.3; 96/142, 147, 131, 132, 135, 136, 139, 152; 123/519

[56] References Cited

U.S. PATENT DOCUMENTS

| | | | |
|---|---|---|---|
| 4,306,894 | 12/1981 | Fukami et al. | 123/519 |
| 4,338,106 | 7/1982 | Mizuno et al. | 96/139 |
| 4,448,594 | 5/1984 | Kozawa | 123/519 |
| 4,496,379 | 1/1985 | Kozawa | 123/519 |
| 5,148,793 | 9/1992 | Reddy | 96/131 |

Primary Examiner—Jay H. Woo
Assistant Examiner—Duane S. Smith
Attorney, Agent, or Firm—Wenderoth, Lind & Ponack

[57] ABSTRACT

A fuel vapor capturing canister includes a casing formed into the shape of a cylinder and accommodating an adsorbent material. A partition member divides the activated carbon into lower and upper layers. The partition member includes a cross rib and upper and lower walls sandwiching the rib. One of four pieces of the cross rib is connected to the inner peripheral wall of the partition member. Two chambers located at both sides of the piece connected to the inner peripheral wall of the partition member communicate with each other through a communicating path defined between the other pieces of the rib and the inner peripheral wall of the partition member. One of the two chambers has in its underside openings communicating with the lower activated carbon layer while the other chamber has in its top openings communicating with the upper activated carbon layer. The fuel vapor flows between the two layers of activated carbon. Since the communicating path between the layers of activated carbon is long, the fuel vapor capturing performance can be improved.

8 Claims, 5 Drawing Sheets

FUEL VAPOR CAPTURING CANISTER HAVING INCREASED DISTANCE OF FLOW OF FUEL VAPOR PASSING THROUGH ADSORBENT LAYER

BACKGROUND OF THE INVENTION

1. Field of the Invention

This invention relates to a fuel vapor capturing canister capturing fuel vapor produced in a fuel system of an engine by means of a layer of adsorbent material to prevent dissipation of the fuel vapor into the atmosphere, and more particularly to such a canister of the type having a plurality of divided layers of the adsorbent material.

2. Description of the Prior Art

Japanese Patent Application Kokai No . 50-22921 (unexamined published patent application) discloses a conventional canister of the above-described type. Referring to FIG. 7 illustrating the disclosed canister, a cylindrical casing 1 formed of an impermeable material accommodates an activated carbon layer 2 therein. One of two surfaces of the activated carbon layer 2 communicates with the atmosphere through an opening 3a of a retainer. The other surface of the activated carbon layer 2 communicates both with a fuel tank 4 and with an intake pipe 5 through separate openings 1a and 1b respectively. The activated carbon layer 2 is divided into two layers 2a and 2b axially of the casing 1 by permeable plate-shaped elastic body 6.

In the above-described construction, fuel vapor produced in the fuel tank 4 enters the upper activated carbon layer 2a through the opening 1a. Passing through the permeable elastic body 6, the fuel vapor then enters the lower activated carbon layer 2b. The fuel component is thus captured by the activated carbon as the fuel vapor passes through its layer. Upon the start of an engine, the negative pressure is supplied to the opening 1b communicating with the intake pipe 5. Air is drawn through the lower activated carbon layer 2b, the elastic body 6 and the upper activated carbon layer 2a sequentially, whereupon the fuel component captured by the activated carbon is purged therefrom to be supplied through the intake pipe 5 to the engine.

The inventors have found that the fuel vapor capturing and purging efficiency can be improved when the path of the fuel vapor passing through the adsorbent material is lengthened. In the above-described canister, however, the air containing the fuel vapor passes through the elastic body 6 when flowing from the activated carbon layer 2a to the activated carbon layer 2b and vice versa. When the thickness of the elastic body 6 is ignored, the distance that the air containing the fuel vapor passes through the activated carbon layer 2 depends upon the length of the casing 1 . The fuel vapor capturing efficiency is lowered as the casing 1 becomes shorter. Thus, the above-described canister poses a problem of the fuel vapor capturing efficiency.

SUMMARY OF THE INVENTION

Therefore an object of the present invention is to provide a canister which can improve the fuel vapor capturing performance without rendering the size of the casing too large.

To achieve the object, the present invention provides a canister comprising a casing formed into the shape of a cylinder and accommodating an adsorbent material therein. The adsorbent material accommodated in the casing has one side communicating with the atmosphere and the other side communicating with a fuel storage system and an intake system of an engine. A partition member is disposed in the casing so as to divide the adsorbent material into two layers. The partition member having two surfaces adjacent to the layers of the adsorbent material respectively and communicating holes formed in both of the surfaces. The communicating hole(s) formed in one of the surfaces of the partition member communicating, via a labyrinth with the communicating hole(s) formed in the other surface of the partition member.

According to the above-described construction, the adsorbent material accommodated in the casing is divided into the two layers. The partition member has the communicating holes formed in the surfaces adjacent to the adsorbent material. The communicating holes in one surface of the partition member communicate with those in the other surface of the partition member through a communicating path. Accordingly, the divided layers of the adsorbent material communicate with each other. Furthermore, the fuel vapor passes along the communicating path through the communicating holes when it passes through the layers of the adsorbent material. That is the fuel vapor and the air passes through the communicating path after they have passed through one of the layers of the adsorbent material. Since the fuel vapor and the air are well mixed in the communicating path, the capture and the purging of the fuel vapor in the subsequent layer of the adsorbent material is performed efficiently.

Thus, the present invention includes a canister in which the fuel vapor capturing efficiency is improved because the fuel vapor passes through a long communicating path when it flows from one layer of the adsorbent material to the other layer.

Another object of the invention is to provide a canister which has a simplified construction.

To achieve the object, the present invention provides canister wherein the partition member has an peripheral shape substantially corresponding to the interior surface of the casing. The partition member is disposed in the casing so as to divide the adsorbent material and be held in position in the casing.

According to the above-described construction, a half of the adsorbent material is put into the casing and then, the partition member is disposed in the casing. The attachment of the partition member is completed when the latter half of the adsorbent material is put into the casing. Consequently, the canister is simplified in construction.

Further, another object of the present invention is to provide a canister which has a partition member having a simplified construction.

T o achieve the object, the present invention provides a canister wherein the partition member includes two plate members each facing a layer of the adsorbent material and a labyrinth communicating wall interconnecting the plate members. The plate members provide the surfaces which are adjacent to the layers of the adsorbent material, Communicating holes are formed in both of the surfaces. The communicating hole(s) formed in the surface of one of the plate members communicates via the labyrinth with the communicating hole formed in the surface of the other plate member.

According to the above-described construction, the communicating path can be readily formed by providing the communicating wall between the two plate members so that the communicating wall interconnects the plate members.

Fur her another object of the present invention is to provide a canister wherein fuel vapor and air can be well mixed in the communicating path.

To achieve the object, the present invention provides a canister wherein the communicating wall includes a plurality of radial walls each extending radially from the center thereof. Several of the walls have an end which forms a gap with an inner peripheral wall of the partition member.

According to the above-described construction, the fuel vapor and the air pass through the gap between the end of radial walls and the inner peripheral wall of the partition member. The fuel vapor and the air repeatedly enter a large space after having passed through the small gap. The fuel vapor and the air mixes with each other when they enter the large space and when they re-enter the small gap. Consequently, the fuel vapor and the air can be well mixed with each other.

BRIEF DESCRIPTION OF THE DRAWINGS

Other objects, features and advantages of the present invention will become clear upon reviewing the following description of the preferred embodiment thereof made with reference to the accompanying drawings in which.

DESCRIPTION OF THE PREFERRED EMBODIMENTS

Figure 1:
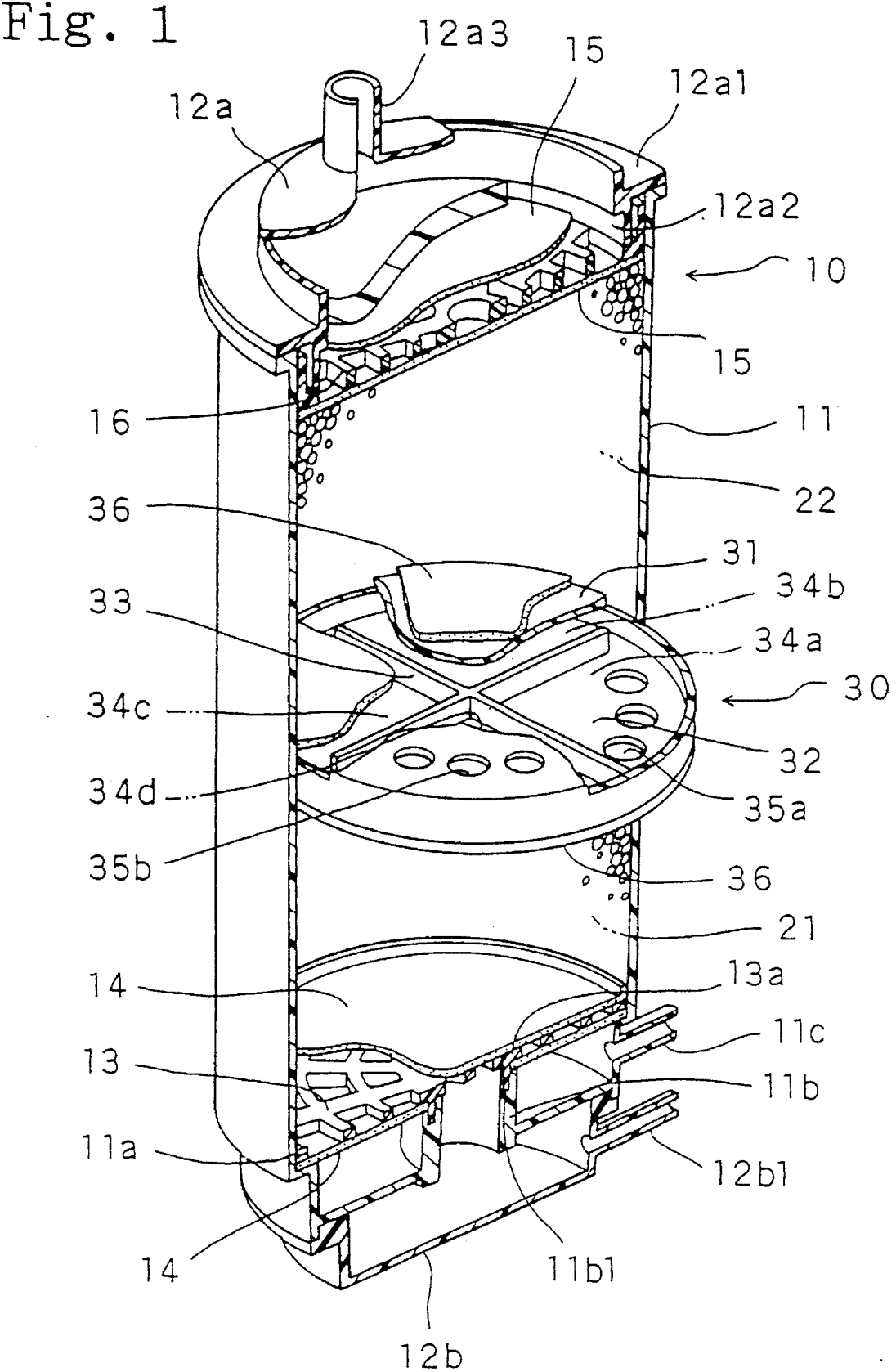
FIG. 1 is a partially broken perspective view of a first embodiment of a canister in accordance with the present invention.
Figure 2:
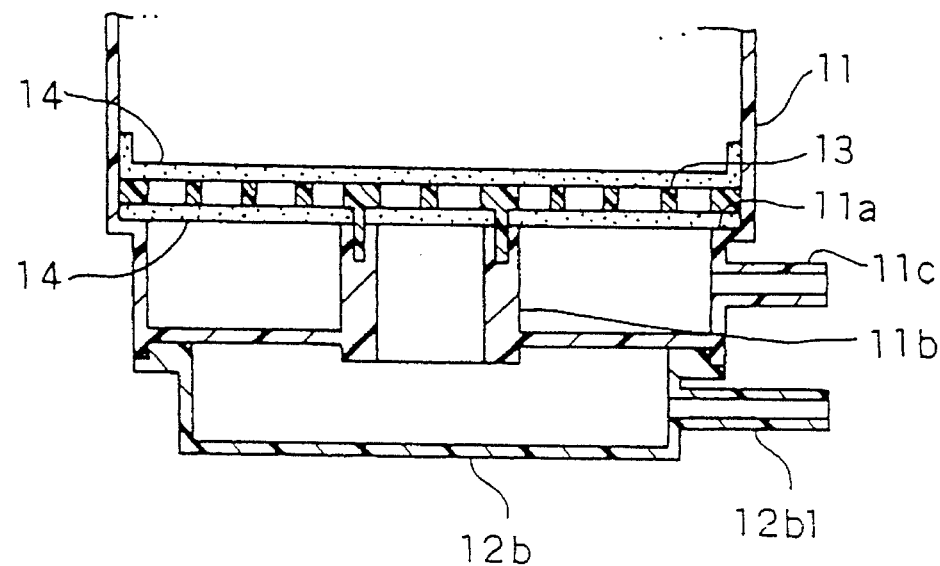
FIG. 2 is a longitudinal sectional view of a lower portion of the canister.
Figure 3:
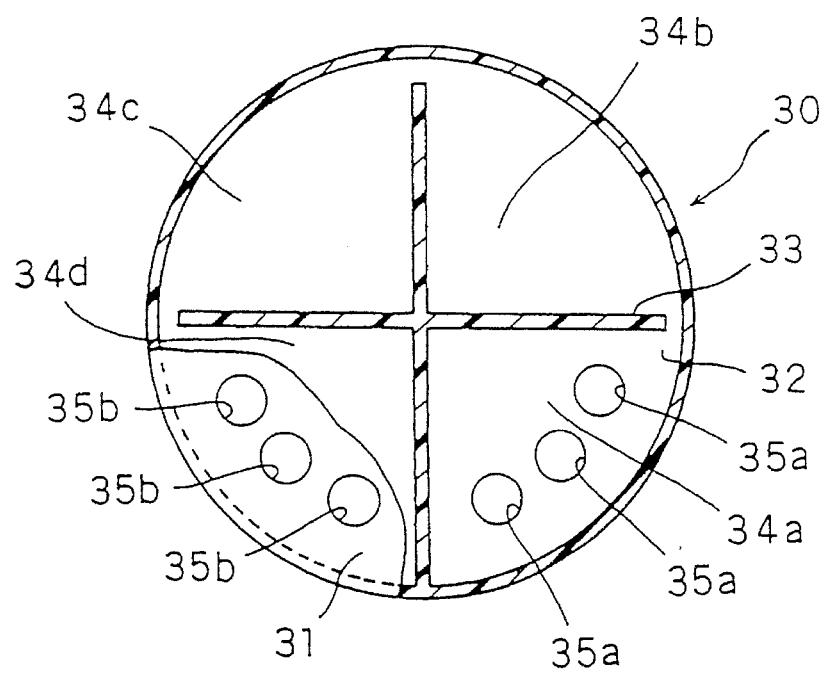
FIG. 3 is a partially broken sectional plan view of a partition member employed in the canister.

A first embodiment of the present invention will be described with reference to FIGS. 1 to 3. Referring to FIG. 1, a canister comprises a casing 10 including a cylindrical body 11, an upper lid 12a and a bottom lid 12b. The diameter of the bottom of the cylindrical body 11 is reduced such that a stepped portion 11a is formed on the inner periphery thereof, as shown in FIG. 2. A cylindrical portion 11b is formed to protrude from a central bottom of the cylindrical body 11. The height of the cylindrical portion 11b corresponds to that of the stepped portion 11a. A drainboard-like lattice member 13 is placed on the stepped portion 11a. The lattice member 13 has a cylindrical rib 13a protruding from the central underside thereof. The rib 13a is inserted into an annular groove 11b 1 formed in the upper end of the cylindrical portion 11bl so that the lattice member 13 is secured in position. Two filter pads 14 each having gas permeability and elasticity are provided on the top and the underside of the lattice member 13 respectively.

The outer periphery of the casing body 11 is formed with a suction pipe 11c located between the stepped portion 11a and the bottom. The suction pipe 11c communicates between the interior and exterior of the cylindrical body 11. The bottom lid 12b is formed into the shape of a dish having an upper opening the periphery of which is hermetically bonded to the underside periphery of the cylindrical body 11. An exhaust pipe 12b1 communicating between the interior and exterior of the dish-shaped bottom lid 12b is also formed on the peripheral wall of the same.

The filter pad 14 is placed on the top of the lattice member 13 as described above. A predetermined amount of activated carbon is put into the casing body 10 until it reaches the level equal to about a half of the whole height of the cylindrical body 11, thereby constituting a lower activated carbon layer 21. A partition member 30 having an external diameter approximately equal to an inner diameter of the cyclindrical body 11 is placed on the upper surface of the lower activated carbon layer 21.

The partition member 30 is formed into the shape of a thin hollow column. A cross rib 33 is formed inside the partition member 30, as shown in FIG. 3. The cross rib 33 interconnects upper and lower wall members 31 and 32. The cross rib 33 serves as a communicating wall or a radial wall, as will be described later. Three of four pieces of the rib 33 are not adjacent to the inner peripheral wall of the partition member 30 and accordingly, a gap is defined between the end of each piece and the inner peripheral wall of the partition member 30. The other piece of the rib 33 is adjacent to the inner peripheral wall of the partition member 30. The interior of the partition member 30 is divided into four chambers 34a, 34b, 34c and 34d by the cross rib 33. The first chamber 34a has in the underside thereof three openings 35a each communicating with the outside of the partition member 30 in the cylindrical body 11. The fourth chamber 34d has in the top three openings 35b each communicating with the outside of the partition member 30 in the cylindrical body 11. Two filter pads 36 each having gas permeability and elasticity are provided on the top and the underside of the partition member 30.

A predetermined amount of activated carbon is put over the filter pad 36 on the top of the partition member 30 until it reaches the upper end of the cylindrical body 11, thereby constituting an upper activated carbon layer 22. A drainboard-like lattice member 16 is placed on the upper surface of the upper activated carbon layer 22. The lattice member 16 has a peripheral portion formed into the shape of a short circular cylinder so that the peripheral portion is closely fitted with the inner peripheral wall of the cylindrical body 11. Two filter pads 15 each having gas permeability and elasticity are disposed on the top and the underside thereof respectively.

The upper lid 12a is formed into the shape of a dish having a lower opening. The upper lid 12a has a flat flange 12a1 formed on the peripheral edge thereof. The flange 12a1 has a presser wall 12a2 forming into the shape of a short cylinder and extending downwardly from the inner peripheral underside thereof. The outer diameter of the presser wall 12a2 is smaller than the inner diameter of the peripheral edge of the lattice member 1B. Accordingly, the upper lid 12a is bonded at its flange 12a1 to the upper end of the cylindrical body 11 to be thereby secured, pressing the presser wall 12a2 from above the lattice member 16. An atmosphere pipe 12a3 is formed on the upper face of the upper lid 12a to communicate between the interior and exterior of the upper lid 12a.

Figure 4:
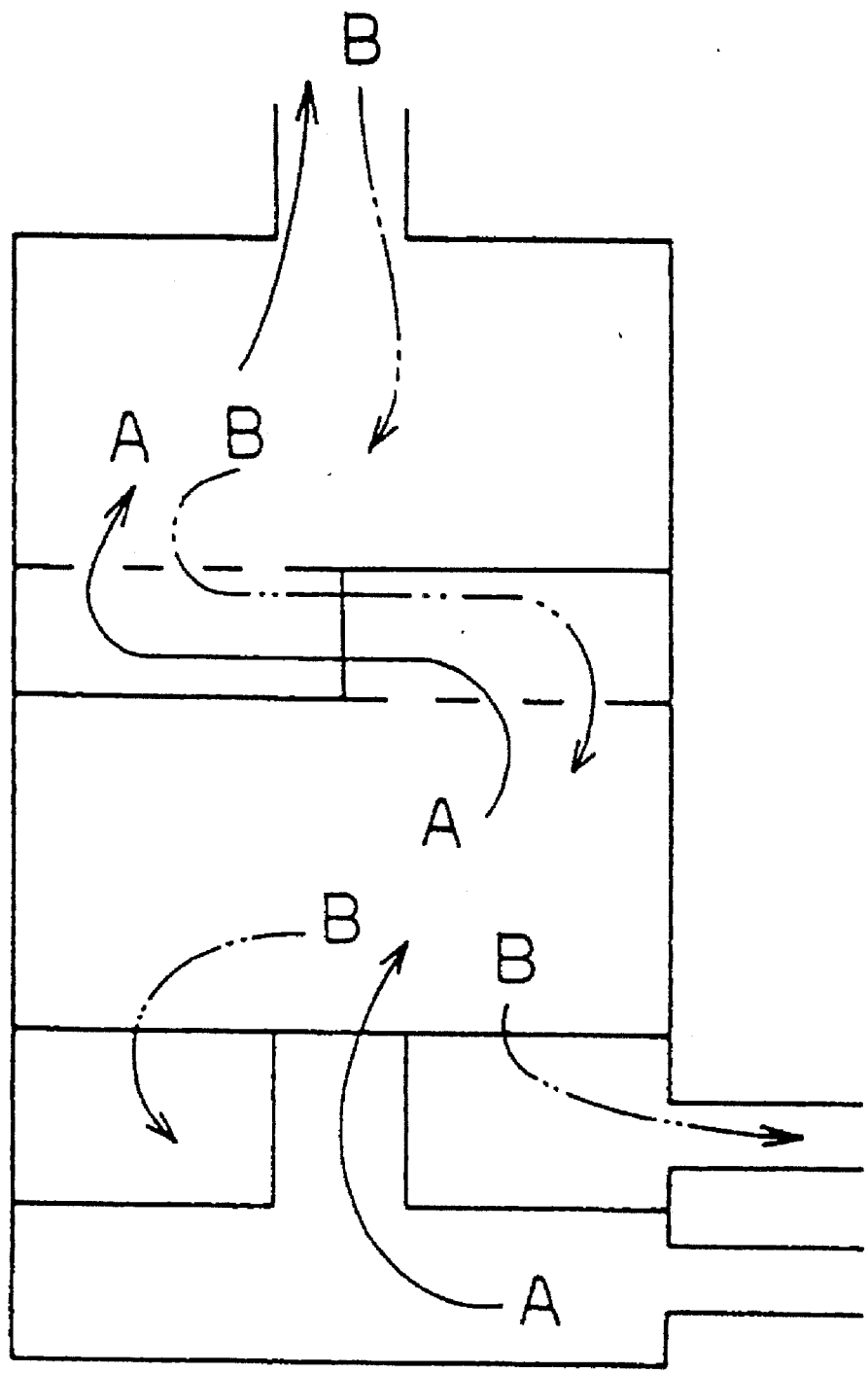
FIG. 4 is a schematically digrammatic view of the canister, showing a path of fuel vapor passing through the absorbent material.

The operation of the canister will now be described. The suction pipe 11c is connected to one of two ends of a pipe which is further connected at the other end to an intake system of an engine. The exhaust pipe 12b1 is connected to one of two ends of a pipe which is further connected at the other end to a fuel tank. Fuel in the fuel tank is vaporized when the atmospheric temperature rises in the stopped state of the engine. The resultant fuel vapor enters the dish-shaped bottom lid 12b through the exhaust pipe 12b1. The fuel vapor further enters the lower activated carbon layer 21 through the cylindrical portion 1ib. The fuel vapor flows upwardly in the lower activated carbon layer 21 with the fuel component being adsorbed by the activated carbon. Reaching the upper end of the lower activated carbon layer 21, the fuel vapor enters the first chamber 34a inside the partition member 30 through the openings 35a formed in the underside of the partition member 30. The fuel vapor passes through the first to fourth chambers 34a–34d, entering the upper activated carbon layer 22 through the openings 35b of the fourth chamber 34d, as shown by arrows-A in FIG. 4.

When passing through the chambers 34a–34d, the fuel vapor passes through the narrow gaps between the ends of the respective three pieces of the cross rib 33 and the inner peripheral wall of the partition member 30. The fuel vapor is well mixed with the air when entering a larger space or each of each of the second to fourth chambers 34b–34d out of the narrow gaps and when entering each of the narrow gaps out of each of the chambers 34a–34d.

The fuel vapor is sufficiently captured by the activated carbon in the lower activated carbon layer 21 and is again captured by the activated carbon when passing through the upper activated carbon layer 22. The fuel vapor containing less amount of fuel component enters the interior of the dish-shaped upper lid 12a, exiting out of the casing body 11 through the atmosphere pipe 12a3.

According to the above-described embodiment, the partition member 30 provides, between the lower and upper activated carbon layers 21, 22, a flow path or a labyrinth through which the fuel vapor turns about 360 degrees. Thus, the path of the fuel vapor passing through the cylindrical body 11 can be rendered longer. Consequently, since the fuel vapor is sufficiently mixed with the air, the fuel component adsorbing efficiency can be improved when the fuel vapor passes through the upper activated carbon layer 22.

Upon start of the engine, the negative pressure is produced in the intake system. The negative pressure is supplied to the suction pipe 11c of the cylindrical 10 of the canister. Since only the atmosphere pipe 12a3 of the cylindrical 10 communicates with the atmosphere, the air is drawn through the atmosphere pipe 12a3 into the dish-shaped upper lid 12a. The air passes through the upper activated carbon layer 22, the fourth to first chambers 34d, 34c, 34b, 34a defined in the partition member 30 and the lower activated carbon layer 21. Since the air passing through the activated carbon layers has low fuel concentration, the fuel component captured by the activated carbon is evaporated by the air and released from the activated carbon. Thus, the air containing the fuel component in high concentration is supplied to the intake system of the engine through the intake pipe 11c. Since the air containing the fuel vapor flows round in the partition member 30, its flow path is increased and the fuel vapor is sufficiently mixed with the air. This enhances evaporation of the fuel component in the lower activated carbon layer 21. The above-described suction path is shown by arrows B in FIG. 4.

In the foregoing embodiment, the partition member 30 is provided with the cross rib 33 partially interconnecting the upper and lower wall members 31, 32 thereof so that the flow path is lengthened. To achieve the same object, a plurality of parallel ribs may be connected alternately to one half of the inner peripheral wall of the partition member 30 and the other half thereof so that the fuel vapor zigzags in the partition member 30. Furthermore, various types of baffle plates may be disposed in the partition member 30 so that the flow path of the fuel vapor can be lengthened. The interior of the partition member 30 may be divided vertically into a plurality of chambers for the same purpose. Additionally, integral or separate ducts may be formed in the partition member 30.

Figure 5:
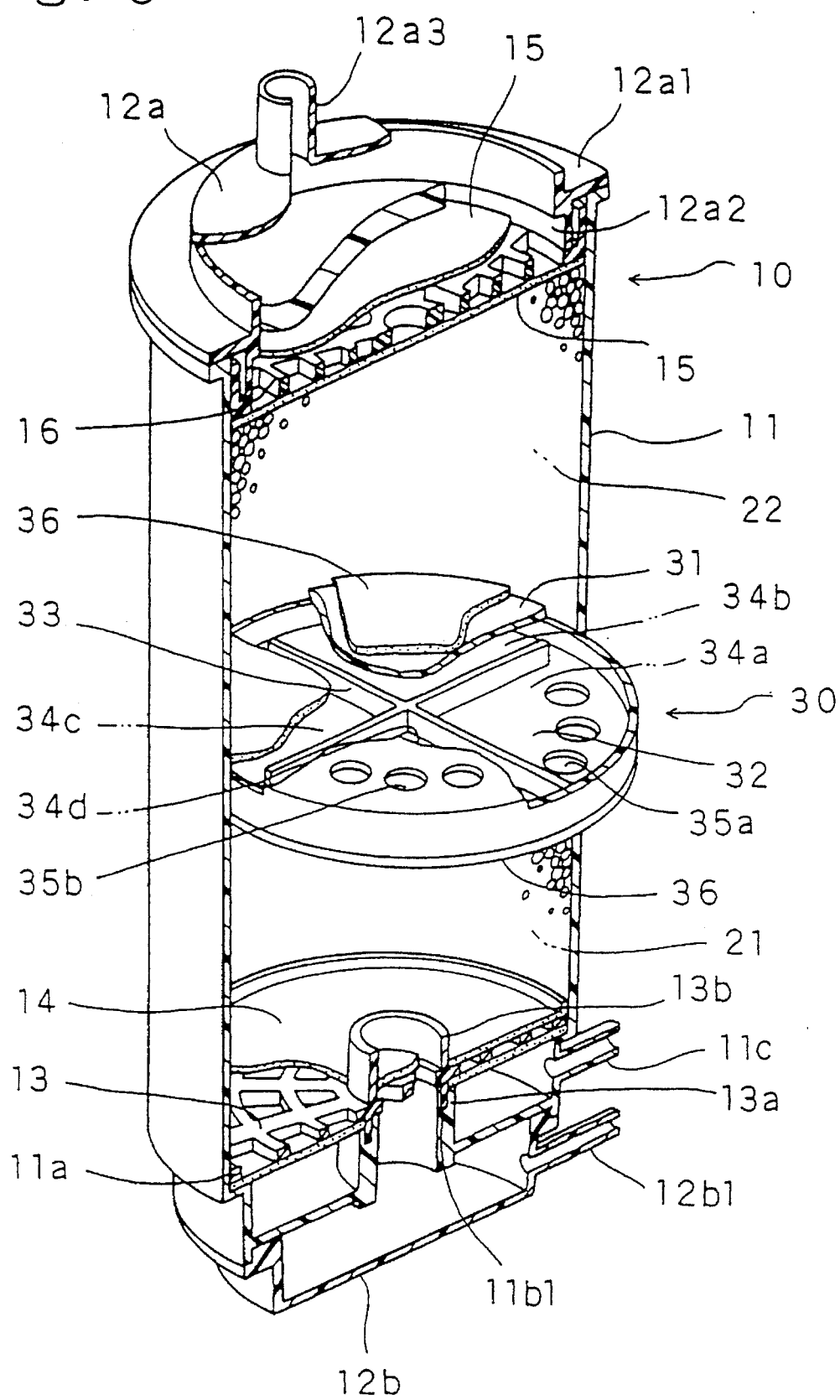
FIG. 5 is a partially broken perspective view of a second embodiment of a canister in accordance with the present invention.
Figure 6:
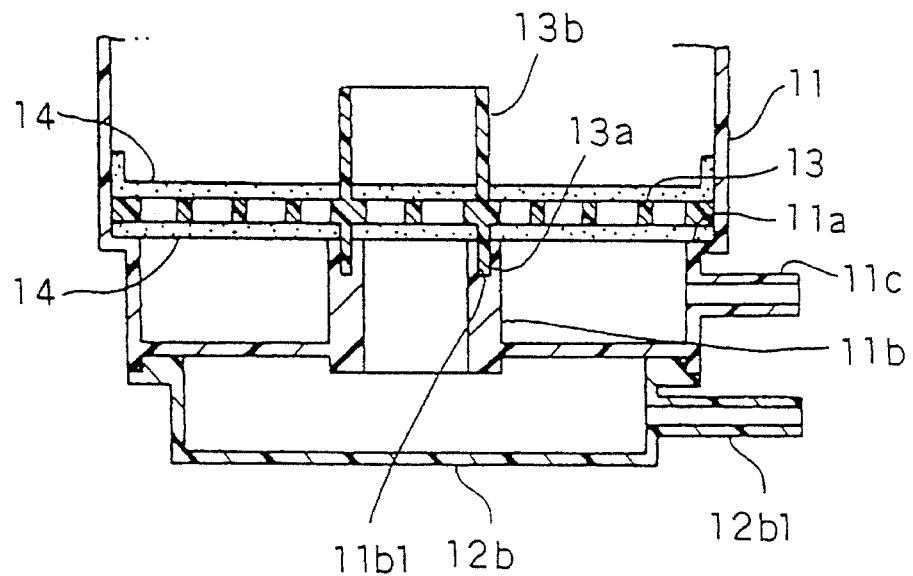
FIG. 6 is a longitudinal sectional view of a lower portion of the canister of the second embodiment.

FIGS. 5 and 6 illustrate a second embodiment of the present invention. A fuel intake cylinder 13b similar to the rib 13a is formed on the side of the lattice member 13 opposite the side on which the rib 13a is formed. When the rib 13a is connected to the upper end of the cylindrical portion 11b. The cylindrical portion 11b is contiguous with the fuel intake cylinder 13b.

Figure 7:
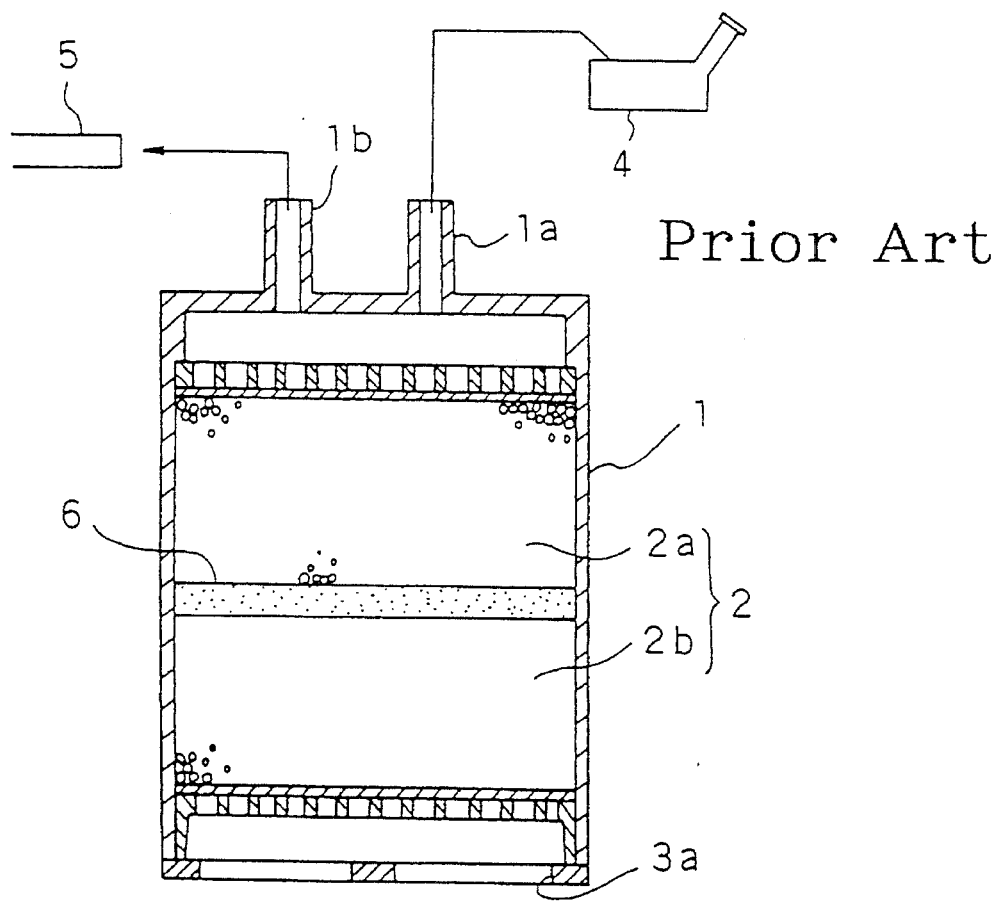
FIG. 7 is a longitudinal sectional view of a conventional canister.

In the above-described construction the fuel vapor produced by vaporization of fuel in the fuel tank enters the bottom lid 12b. The fuel vapor then enters the lower activated carbon layer 21 through the cylindrical portion 11b and the fuel intake cylinder 12b in turn. The fuel vapor flows upwardly in the lower activated carbon layer 21, diffusing transversely. In this regard, the fuel vapor would reach the partition member 30 with insufficient transverse diffusion if the fuel intake cylinder 13b should not have a sufficiently low height. In the embodiment, however, the fuel vapor enters the lower activated carbon layer 21 through an opening of the fuel intake cylinder 13b even when the height of the fuel intake cylinder is low. Accordingly, the fuel vapor produced in the fuel tank upon start of the engine exits out of the opening of the fuel intake cylinder 13b and then passes through the activated carbon layer, whereupon the fuel vapor is supplied to the intake system of the engine. Without the fuel intake cylinder 13b, the fuel vapor having entered the casing 1 through the opening 1a would sometimes be supplied into the suction pipe 5 through the opening 1b without passing through the activated carbon layer 2a, as shown in FIG. 7. In this case the concentration of the fuel supplied to the engine becomes uneven, which renders the operation of the engine unstable. In the second embodiment, however, the fuel vapor is supplied through the adsorbent layer to the suction system of the engine and accordingly, the operation of the engine can be stabilized.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invent ion as defined by the appended claims.

We claim:

1. A canister comprising:

a cylindrical casing enclosing an adsorbent material and having first and second ends, said first end having an opening for communicating with the atmosphere, said second end having a first opening for communicating with the exhaust of a fuel tank and a second opening for communicating with an intake system of an engine; and a partition member disposed in the casing so as to divide said adsorbent material into a plurality of layers, said partition member including an upper surface and a lower surface spaced from said upper surface, at least one through hole formed in each said surface, and a labyrinth structure extending between said upper and lower surfaces and defining a flow path through said partition member along which path vapors must flow to pass through said partition member, wherein said at least one upper through hole is laterally offset from said at least one lower through hole with respect to the central axis of said cylindrical casing such that said flow path between said through holes is of a greater distance than the thickness of said partition member as taken between said upper and lower surfaces.

2. The canister as claimed in claim 1, wherein the partition member comprises two plate members defining said upper and lower surfaces and interconnected by said labyrinth structure.

3. The canister as claimed in claim 1, wherein said labyrinth structure comprises a plurality of radial walls extending radially from the central axis of said partition member.

4. The canister as claimed in claim 3, wherein said partition member further includes a cylindrical wall interconnecting the peripheral edges of said upper and lower surfaces.

5. The canister as claimed in claim 4, wherein one of said plurality of radial walls engages an inner surface of said cylindrical wall of said partition member and another of said plurality of radial walls extends to a position adjacent said cylindrical wall forming a gap therebetween.

6. The canister as claimed in claim 1, wherein said second end includes structure defining separate first and second flow paths from said first and second end openings, respectively, to said adsorbent material and said structure comprising a conduit extending said first flow path into said adsorbent material layer.

7. A canister comprising:

a cylindrical casing enclosing an adsorbent material and having first and second ends, said first end having an opening for communicating with the atmosphere, said second end having a first opening for communicating with the exhaust of a fuel tank and a second opening for communicating with an intake system of an engine; and a partition member disposed in the cylindrical and dividing said adsorbent material within said casing, said partition member including an upper plate having at least one opening extending therethrough, a lower plate having at least one opening extending therethrough, a structure interconnecting said plates and defining a flow path communicating between said upper and lower openings, wherein each said at least one opening of the upper plate is laterally offset from each said at least one opening of the lower plate with respect to the central axis of said cylindrical casing such that the distance of any path of flow through said partition member is greater than the thickness of said partition member.

8. The canister as claimed in claim 7, wherein said second end includes structure defining separate first and second flow paths from said first and second end openings, respectively, to said adsorbent material and said structure comprises a conduit extending said first flow path into said adsorbent material layer.

* * * * *